Patented Dec. 9, 1924.

1,518,607

UNITED STATES PATENT OFFICE.

PORTER W. SHIMER, OF EASTON, PENNSYLVANIA.

TREATMENT OF CASE-HARDENING BATHS.

No Drawing. Application filed June 29, 1922. Serial No. 571,813.

*To all whom it may concern:*

Be it known that I, PORTER W. SHIMER, residing at Easton, in the county of Northampton, State of Pennsylvania, have invented certain new and useful Improvements in Treatment of Case-Hardening Baths; and I do hereby declare the following to be a full, clear, and exact description of the invention, such as will enable others skilled in the art to which it appertains to make and use the same.

This invention relates to molten baths for case-hardening steel and has among its objects the renewal of the case-hardening activity of such baths after they have been used, or abused for some time.

In my United States Patents No. 1,279,457 and No. 1,279,458, I have described molten baths containing such mixtures as calcium chloride and sodium chloride; potassium chloride and sodium chloride; and other similar compounds and mixtures which after being subjected to the action of calcium cyanamide immersed therein, acquire case-hardening properties.

I find that after a case-hardening bath of the character described has been in use for a considerable period of time, especially under crude operating conditions, the bath gradually loses its power of acquiring full case-hardening properties through the action of calcium cyanamide thereon as referred to above. This loss in the power to acquire case-hardening properties (frequently hereinafter referred to as loss of case-hardening activity or simply as loss of activity) is sometimes augmented by long continued use of the bath on a large production scale, particularly when the articles being case-hardened are coated with scale or when cast iron pots are used to contain the melt. Also I have found that trouble from this source is frequently accentuated when baths containing calcium chloride have not been thoroughly dried or when they have taken up water by long standing under exposure to atmospheric moisture or moisture from other sources. Furthermore, I have found that this loss in case-hardening activity seems to increase with the amount of lime, iron and other impurities, including silica, that are taken up by the bath from extraneous sources and particularly from the calcium cyanamide lumps which are suspended in the bath for the purpose of imparting case-hardening activity thereto in accordance with the methods described in my prior patents referred to above.

When used baths or deteriorated baths which have lost more or less of their case-hardening activity, are subjected to further action of calcium cyanamide to impart case-hardening properties in the usual manner, I find that the lumps of calcium cyanamide or coked calcium cyanamide often become coated to a greater or less degree with a layer of material which ordinarily has a copper colored appearance and I believe that this coating over the calcium cyanamide has the effect of impeding the taking up from the calcium cyanamide by the bath of those constituents of the calcium cyanamide which impart the original case-hardening activity to the bath. A film of this material also adheres to or deposits on the steel parts immersed in the bath, causing an impediment to case-hardening. The film will also form on other infusible solids immersed in the bath.

In accordance with the present invention when such deteriorated baths with low case-hardening activity are subjected to a treatment which results in the separation from the molten bath of a basic dross relatively high in calcium and iron content, I find that the bath again acquires its full original activity. Also I find that when a bath treated in this manner is again subjected to the action of fresh calcium cyanamide, the separation of the copper colored insoluble compound upon the surface of the calcium cyanamide no longer takes place to any considerable extent. Furthermore the reactivated bath from which the basic dross has been separated, has the power to dissolve the copper colored coating from the surface of calcium cyanamide which has previously been immersed in a deteriorated or inactive bath.

The basic dross which results from the treatment of the bath in accordance with my invention, ordinarily contains a higher percentage of calcium and iron than the bath after treatment; and I find also that after the separation of the dross the calcium content of the bath is considerably lower than it was before the separation of the dross. I also find that the basic dross contains a higher percentage of iron than the bath from which the dross has been caused to separate. The treated bath is, as a rule, very much whiter than the untreated bath of low activity before the dross has been caused to separate therefrom, and in general the treated bath is in a higher state of purity and more nearly approaches in composition a freshly prepared and unused bath of the character described in my two patents referred to above.

The changes which occur in a freshly made bath with continued use and which result in a deteriorated bath of low case-hardening activity consist in part, I believe, in the formation of basic compounds in the bath, particularly basic chlorides such as calcium oxychloride and I conceive that the effect of moisture mentioned above in forming these impurities is that it brings about a limited hydrolysis of certain of the chlorides such as calcium chloride to produce basic chlorides such as calcium oxychloride and a certain amount of hydrochloric acid which is driven off, or the reaction may sometimes go further, I believe, to produce calcium oxide dissolved in the molten bath. Also I conceive that the deleterious effects upon the case-hardening activity of the bath produced by long continued immersion of the calcium cyanamide are due to a dissolution of basic calcium compounds or like basic compounds from the calcium cyanamide by the action of the bath.

As a reagent for bringing about a separation of the basic dross I use preferably a substance capable of mixing, fusing, melting, or dissolving in the molten bath and which, after it has thus become incorporated in the bath reacts with or otherwise affects the constituents thereof in such way as to form a basic dross rich in lime and insoluble in the molten bath. Also I prefer to carry out this reaction in such manner or produce it with a reagent of such character, that the resulting dross is not only insoluble in the molten bath but is also granular or lumpy in character so that it may be readily removed from the molten bath by means of a suitably preforated ladle.

In the practice of my invention in its preferred form, I employ, as a reagent for bringing about the separation of the basic dross, ordinary metallic aluminum and I prefer to add the metallic aluminum to the bath while it is in the molten condition, although I may add it in powdered form to the original bath mixture and also I prefer to use ordinarily only about an ounce of metallic aluminum to a pot containing say about 100 pounds of the molten mixture such as calcium chloride and sodium chloride. The addition of the metallic aluminum soon causes a noticeable activity or commotion in the bath, followed by the separation of lumps of dross, a part of which floats on top of the bath, the remainder settling to the bottom. When the bath has been kept at the proper temperature for about two hours the separation will be complete and the dross must then be thoroughly removed from the top, bottom and side of the pot, best by means of a suitable perforated ladle.

After this purification, which commonly need not be repeated for several weeks, the basket containing the calcium cyanamide is again immersed in the melt in accordance with the procedure described in my two U. S. patents referred to above and the case-hardening properties will then be found to have been fully restored.

While I do not wish to restrict the scope of my invention by any unwarranted assumptions as to the exact chemical reactions brought about by the aluminum or equivalent reagent, nevertheless I am of the opinion that the metal first reacts with oxygen or oxide in the bath at the somewhat elevated temperature thereof to produce an oxide of the aluminum and then the oxide thus formed combines with lime, etc., in the bath to form compounds of higher melting point than that of the bath. As a result of the higher melting point of the compounds thus formed and also because of their insolubility in the molten bath, they separate from the bath in the form of a basic dross.

It will be understood that my invention is not restricted to the employment of metallic aluminum as the reagent in the example described above but I may use any equivalent reagent fulfilling the requirements already referred to namely that the reagent must be capable of reacting either directly or indirectly with the excess of lime or calcium oxide or other objectionable constituents in the bath to form compounds therewith which are insoluble in the molten bath. Thus in place of metallic aluminum I may use metallic alloys relatively rich in aluminum or I may use metallic magnesium, or like powerful deoxidizing metals or alloys thereof rich in these metals. Also I may use in place of metallic aluminum the chloride of aluminum or the chloride of chromium since these compounds meet the requirements referred to above, that is to say they are capable of reacting in such way as to effect the elimination from the bath of the excess calcium oxide (or calcium oxychloride) or like objectionable impurities in the bath through the formation of an insoluble dross.

Other equivalent reagents will be obvious to those skilled in the art concerned.

I claim:

1. The method of imparting case-hardening properties to a molten bath of the character described which comprises subjecting the bath to the action of a strongly deoxidizing metal and then subjecting the bath to the action of calcium cyanamide substantially as described.

2. The method of imparting case-hardening properties to a molten bath of the character described, which comprises subjecting the bath to the action of metallic aluminum and then subjecting the bath to the action of calcium cyanamide substantially as described.

In testimony whereof I affix my signature.

PORTER W. SHIMER.